United States Patent
Brandwine

(10) Patent No.: US 9,722,932 B1
(45) Date of Patent: Aug. 1, 2017

(54) PACKET PATH SELECTION USING SHUFFLE SHARDING

(71) Applicant: Amazon Technologies, Inc., Reno, NV (US)

(72) Inventor: Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 125 days.

(21) Appl. No.: 14/526,410

(22) Filed: Oct. 28, 2014

(51) Int. Cl.
*H04L 12/851* (2013.01)
*H04L 12/741* (2013.01)

(52) U.S. Cl.
CPC .......... *H04L 47/2441* (2013.01); *H04L 45/74* (2013.01)

(58) Field of Classification Search
USPC ......................................................... 370/235
See application file for complete search history.

(56) References Cited

U.S. PATENT DOCUMENTS

| | | | |
|---|---|---|---|
| 6,993,021 B1 | 1/2006 | Chuah et al. | |
| 7,486,676 B1 * | 2/2009 | Dunn | H04Q 3/0025 370/392 |
| 7,782,782 B1 | 8/2010 | Ferguson et al. | |
| 7,865,586 B2 | 1/2011 | Cohn | |
| 8,244,909 B1 | 8/2012 | Hanson et al. | |
| 8,331,371 B2 | 12/2012 | Judge et al. | |
| 8,358,658 B2 | 1/2013 | Flynn et al. | |
| 8,478,896 B2 | 7/2013 | Ehlers | |
| 8,516,096 B2 * | 8/2013 | LeBlanc | H04L 45/24 370/328 |
| 8,693,470 B1 | 4/2014 | Maxwell et al. | |
| 9,237,100 B1 * | 1/2016 | Mizrahi | H04L 45/7453 |
| 2006/0063484 A1 * | 3/2006 | Proctor | H04B 7/15542 455/7 |
| 2007/0041326 A1 * | 2/2007 | Babiarz | H04L 41/5022 370/237 |

OTHER PUBLICATIONS

U.S. Appl. No. 14/083,005, filed Nov. 18, 2013, Matthew Shawn Wilson.
U.S. Appl. No. 12/825,212, filed Jun. 28, 2010, Alan M. Judge et al.
U.S. Appl. No. 13/252,712, filed Oct. 4, 2011, Richard H. Galliher III, et al.
Costin Raiciu, et al "Improving Datacenter Performance and Robustness with Multipath TCP" SIGCOMM'11, Aug. 15-19, 2011, pp. 1-12.

(Continued)

*Primary Examiner* — Mohammad Anwar
*Assistant Examiner* — Kokou R Detse
(74) *Attorney, Agent, or Firm* — Robert C. Kowert; Meyertons, Hood, Kivlin, Kowert & Goetzel, P.C.

(57) ABSTRACT

A path selector device of a network receives a network packet. A packet flow category to which the packet belongs is identified. A candidate outbound link set corresponding to the packet flow category, comprising a subset of the available outbound links of the path selector device, is determined. The packet is transmitted on a particular outbound link of the candidate outbound link set. Subsequent packets of the packet flow category are distributed among the members of the candidate outbound link set.

21 Claims, 9 Drawing Sheets

(56) References Cited

OTHER PUBLICATIONS

Albert Greenberg, et al "VL2: A Scalable and Flexible Data Center Network" Communications of the ACM, vol. 54, No. 3, Mar. 2011, pp. 1-10.
Chuanxiong Guo, et al "BCube: A High Performance, Server-centric Network Architecture for Modular Data Centers" SIGCOMM'09 Aug. 17-21, pp. 1-12.
U.S. Appl. No. 13/073,182, filed Mar. 28, 2011, Daniel T. Cohn, et al.
"On the Impact of Packet Spraying in Data Center Networks", Advait Dixit, et al., 2013, pp. 1-9.
"Shuffle Sharding: Massive and Magical Fault Isolation", Amazon webservices, Apr. 14, 2014, pp. 1-6.
U.S. Appl. No. 14/736,163, filed Jun. 10, 2015, Colm MacCarthaigh.
U.S. Appl. No. 14/736,165, filed Jun. 10, 2015, Colm MacCarthaigh.
U.S. Appl. No. 14/736,167, filed Jun. 10, 2015, Colm MacCarthaigh.
U.S. Appl. No. 14/736,172, filed Jun. 10, 2015, Colm MacCarthaigh.

\* cited by examiner

PACKET PATH SELECTION USING SHUFFLE SHARDING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers.

In large data centers, interconnect topologies that include multiple physical network paths between a given pair of resources are often set up, with roughly the same latency expected for packets that take different paths between the resources. For example, an interconnect comprising multiple tiers of network switches may be configured in a fat tree or Clos topology, with numerous output ports and input ports linking each switch to switches of other tiers. Although some switches may support the distribution or "spraying" of packets across all their outbound links to reduce workload imbalances, a failure of any particular switch or link of the interconnect may disrupt a large number of traffic flows in such configurations.

Figure 1:
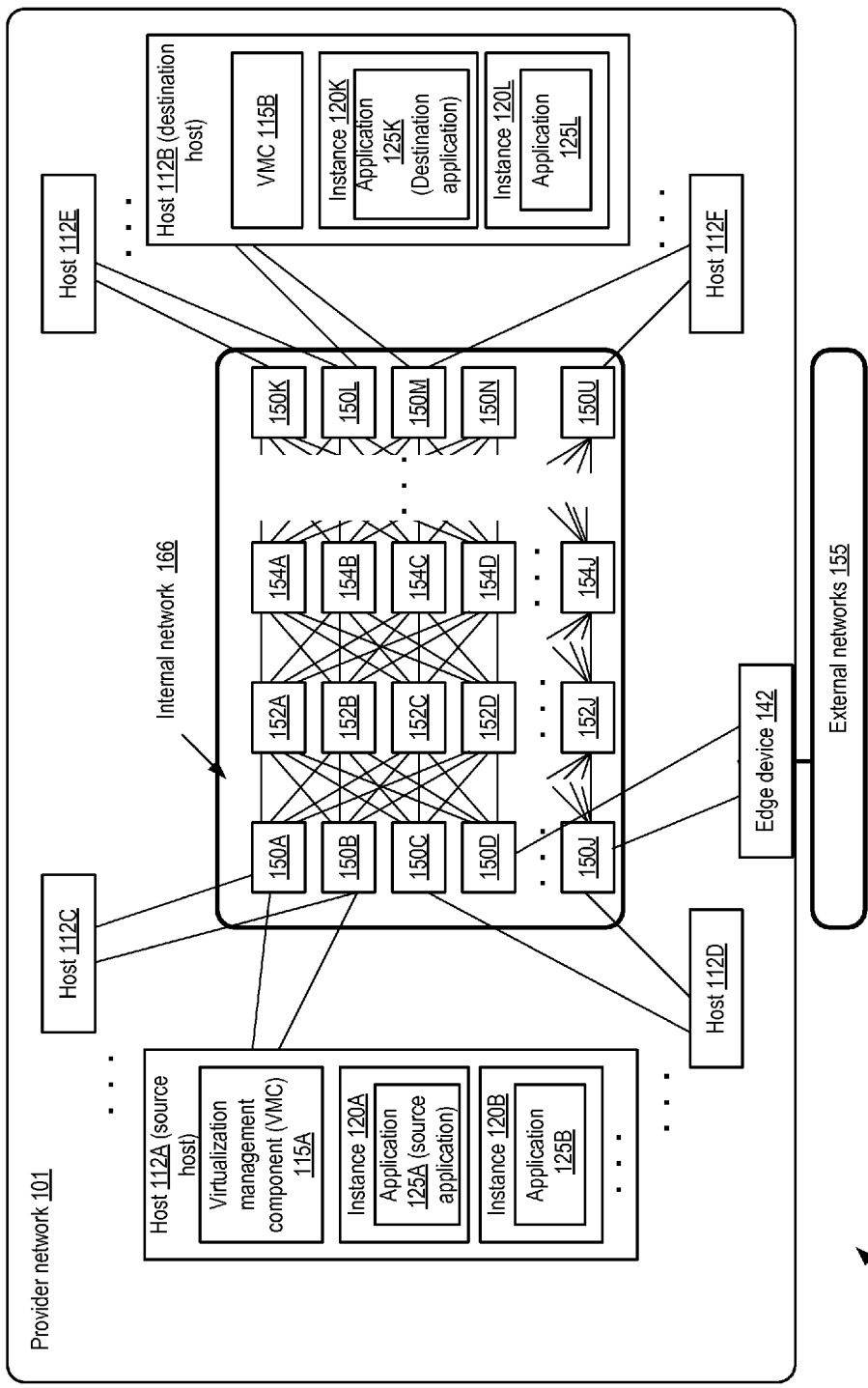
FIG. 1 illustrates an example system environment in which hosts of a provider network are linked by a multi-layer, multi-path interconnect, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for network packet path selection using shuffle sharding are described. The path selection techniques described herein may be employed in a variety of environments, including large-scale provider networks that are used by hundreds or thousands of end-users and businesses, as well as private data centers of large corporations or government agencies. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. At least some provider networks may also be referred to as "public cloud" environments. A given provider network may include numerous data centers hosting various resource pools, such as collections of physical and/or virtualized compute servers, storage devices, networking equipment and the like, needed to implement, configure and distribute the infrastructure and services offered by the provider. In at least some embodiments, at least some of the data centers may include internal high-radix interconnects capable of handling very high bandwidth traffic flow between other resources located at the same data center. Such internal interconnects may, for example, comprise switches arranged in some number of tiers, e.g., using variants of "fat tree" or "Clos network" topologies. In some data centers, switches with 24, 48, 64 or more output ports may be deployed in such configurations.

Depending on the topology, the fan-out (the number of output ports per switch) at each layer, and the number of tiers of the internal network, a large number of different physical paths may be available between a given traffic source and a given traffic destination at a data center. In an N-tier interconnect, each such path may, for example, include N switches and N+1 physical links or hops—one link from a source device to the first tier of the interconnect, N−1 links in all between successive tiers, and one link between the interconnect and the destination. In many implementations the switches within a given tier typically have similar performance capabilities (e.g., the same number of output ports/links and the same aggregate bandwidth capacity), although such uniformity may not be required. It is noted, however, that in general, not all the tiers may have identical switches—switches at tier K may have a different number of outbound ports and/or a different aggregate bandwidth than switches at a different layer N, for example.

Many such interconnects are designed to be balanced or regular, in that, at least for many (source, destination) pairs, the number of physical links traversed along any given path is often the same as the number of physical links traversed along any other path. As a result of such regularity, the time taken for a network packet to traverse any one path between a source and a destination is often very close to the time that would be taken to traverse any other alternative path. Therefore, if different packets of a given sequence of packets are propagated along different routes within a balanced interconnect of this kind (e.g., in an effort to balance workload among different parts of the interconnect), the probability that the packets will be delivered out of order at the destination is typically reasonably low. Since many commonly-used networking protocols, including TCP/IP (Transmission Control Protocol/Internet Protocol) are designed to provide in-order delivery of packets, and incur retransmission-related overhead if packets of a given flow or connection are not initially delivered in order, it may be desirable to reduce the occurrence of out-of-order packet deliveries as much as possible when such protocols are used. The distribution of packet flows among multiple paths of balanced interconnects may thus be well suited for delivery-order-dependent protocols.

In order to enable data center operators to distribute traffic among multiple parallel paths in such interconnects, some switch vendors have implemented support for "packet spraying". In some versions of packet spraying, if there are N outbound links from a given switch at a particular tier of the interconnect, the packets received at the switch may be distributed, often uniformly, among all the N outbound links. Thus, under normal working conditions, all the links between one tier of the interconnect and an adjacent tier may be utilized to approximately the same extent if packet spraying is used. However, as the size (e.g., the total number of switches and links between switches) of an interconnect increases, the probability that at least one component of the interconnect will fail during a given time interval increases as well. If the kind of maximal packet spraying described above is used, in which most or all the switches of a given tier are involved in transmitting the traffic of each source/destination pair, a failure of any given switch has the potential to disrupt a large number of traffic flows. Ideally, data center operators would prefer to have higher levels of fault isolation, in which a given failure affects as few customers as possible.

Accordingly, in some embodiments, at least some of the switches of an interconnect may be configured to implement a shuffle sharding technique that trades off desired levels of workload distribution with desired levels of fault isolation. In such a technique, a switch that has multiple outbound links available to other switches within the interconnect may assign a received packet to a flow category (e.g., based on various factors such as the source or destination indicated in the packet header, and/or a switch-specific link polarization reduction factor as described below in further detail). Based on the flow category, the switch may then identify a subset of the output links that are available to the destination as candidates for distributing outbound traffic of the flow. If, for example, 64 outbound links are available at the switch, a subset comprising 4 outbound links may be selected as candidates for a given flow category F1. Then, a particular one of the candidate links may be selected (e.g., at random) for transmitting the packet on towards the next tier of the interconnect. The number of candidates chosen at a given switch or at a given tier may be selected based on a combination of various goals or requirements of the interconnect, such as fault isolation goals and/or load balancing goals. The selected subset of candidate output links may be referred to as a "shard" or "partition" of the larger available set of output links herein. The term "shuffle sharding" may be used to refer to the selection of the candidate links because respective groups of the outbound links may be identified using a combinatorial or "shuffling" approach (similar in concept to selecting subsets of a deck of shuffled cards) as described below. For example, from a total of 64 outbound links available at a given switch, a combinatorial technique may be used to compute a desired number of combinations of 8 links as candidate outbound link sets for respective flow categories in one embodiment.

In at least some embodiments, the identification of the packet's flow category, the selection of the candidate set of outbound links, and/or the selection of the particular link on which the packet is to be transmitted, may all be performed in fast path circuitry of the switch (e.g., using hardware). A switch that is configured to implement such a technique may represent a specific example of a broader category of devices or components called "path selectors" at which shuffle sharding techniques may be used for routing network traffic. Such path selectors may be implemented in software in some embodiments, e.g., in packet encapsulation modules of a virtualization management component as described below in further detail. Thus, the technique of categorizing received packets into flows, selecting respective shards or partitions of candidate outbound pathways for respective flows, and transmitting packets along a pathway selected from among the candidates, may be performed at a variety of devices and at a variety of different logical layers of a networking stack in different embodiments. Furthermore, the path selection decision for a given network packet may be made in a stateless manner by path selectors in at least some embodiments, independently of the decisions regarding any previous or subsequent packets of the same flow category (or of any other flow category). To select a specific outbound link from among the members of a candidate output link set to be used for a packet, any of a number of approaches may be used in different embodiments, such as random selection, round-robin selection, or selection based on a hash value derived from at least a portion of the packet. Depending on the particular technique used, the packets comprising a given flow category may in general be distributed relatively evenly among the candidate outbound slots, thus providing workload balancing among the candidate set members.

In some embodiments, the decisions regarding routing of a given packet may be made for one path selector tier or one link at a time—for example, at a given switch, only the decision regarding the outbound link to be used to transmit the packet to the next device on its route may be made. In other embodiments, however, decisions regarding several successive links or hops on which the packet is to be transmitted may be made at a single path selector. For example, consider a scenario in which the interconnect comprises five tiers of switches, T1 through T5. In one such embodiment, a switch S1 at tier T1 may select (using the shuffle sharding approach to select subsets of available outbound links for each tier) outbound links O1, O2 and O3 to be used for a given packet P at tiers T1, T2, and T3 respectively. A list of the selected outbound links for layers T2 and T3 may be included in a "label" or other metadata element associated with the packet P, and passed on to the tier T2 switch S2 reached via O1 from S1. In a manner analogous to that used in a protocol such as MPLS (Multiprotocol Label Switching), S2 may simply parse the label to determine that O2 should be used as the outbound link, without having to perform any additional path selection operations. Similarly, a third switch S3 at tier T3 may receive P and its label, and transmit P along outbound link O3, without performing any path selection operations besides reading/parsing the label prepared at S1. At the fourth tier T4 in this example scenario, a switch S4 that receives P from S3 may select the outbound link on which P is to be transmitted to tier T5 based on straightforward single-link shuffle sharding. At tier T5, the last switch tier, shuffle sharding may not be required in the example scenario, as only a small number of alternative paths may be available to P's indicated destination. In other scenarios, the entire path of a given packet may be determined at a single switch (e.g., in a variation of the example, switch S1 at tier T1 may select, using shuffle sharding, a sequence of four outbound links O1, O2, O3 and 04 to be used at tiers T1, T2, T3 and T4 respectively for the packet). Such a use of labels may require more computation and/or storage (e.g., metadata about the shuffle sharding configuration parameters to be used at various succeeding tiers) at the path selectors at which multi-link route selection decisions are made than at the path selectors that simply utilize the labels.

Example System Environment

FIG. 1 illustrates an example system environment in which hosts of a provider network are linked by a dense, multi-layer, multi-path interconnect, according to at least some embodiments. The term "internal network" may also be used herein to refer to such interconnects. As shown, provider network 101 of system 100 includes several hosts 112, such as hosts 112A, 112B, 112C, 112D and 112F, at least some of which are connected to each other via the internal network 166. In addition, traffic between external networks 155 (which may include, for example, devices of the public Internet or client-owned networks) and the hosts of the provider network may be routed via one or more edge devices 142 (e.g., gateways, routers, and the like) which are also connected to internal network 142. A virtual computing service of provider network 101 may enable clients to utilize one or more guest virtual machines (which may be referred to herein as "virtualized compute servers", "compute instances" or simply as "instances") for their applications, with one or more compute instances being executed on any given host 112 of a large fleet of instance hosts. Several different kinds of instances may be supported in some implementations, e.g., "large", "medium" or "small" instances that have different compute performance capabilities, different memory sizes and different amounts of persistent storage space.

The hosts 112 of FIG. 1 may each be used for several instances 120. For example, host 112A includes instance 120A and 120B at which respective applications 125A and 125B are run on behalf of clients of the virtual computing service, and host 112B includes instances 120K and 120L with applications 125K and 125L. Each host 112 may include one or more virtualization management components (VMCs) 115 in the depicted embodiment, which may serve as intermediaries between the guest virtual machines (the instances 120) and the host's hardware. A VMC 115 may include, for example, a hypervisor and/or a privileged (administrative) operating system (sometimes referred to as a "domain zero" or "dom0" operating system). Each compute instance may include its own operating system and networking software stack, and may be assigned one or more network addresses (such as IP addresses) that can be used as source/destination addresses for network packets produced on behalf of applications 125. Some applications 125 running on different instances may communicate with each other (or with devices in external networks 155) via the internal network 166. For example, application 125A of instance 120A at host 112A may be a source of a set of packets that are to be transmitted to destination application 125L of instance 120L at host 112B over the internal network 166.

As shown, the internal network 166 may include a plurality of different physical paths between various pairs of hosts 112. In the depicted embodiment, the internal network 166 is shown as comprising a number of distinct layers, including outer layers (i.e., layers directly connected to hosts 112) comprising path selectors 150 (e.g., 150A, 150B, 150C, 150D, 150J, 150K, 150L, 150M, 150N, and 150U), and inner layers (not directly connected to hosts 112) comprising different classes of path selectors 152 (e.g., nodes 152A, 152B, 152C, 152D, . . . , 152J) and 154 (e.g., 154A, 154B, 154C, 154D, . . . , 154J). The path selectors 150, 152, and/or 154 may comprise, for example, various types of switches (e.g., intelligent switches equipped with routing functionality), routers, and/or various other types of networking devices in different embodiments. Path selectors 150, 152 and 154 may collectively be referred to herein as nodes of the internal network 166. In at least some embodiments, the path selectors may comprise inexpensive commodity hardware and/or software components. In the depicted embodiment, the outer layer path selectors 150 may differ from the inner layer path selectors 152 or 154 in various characteristics, such as the physical arrangement of the devices (e.g., outer layer path selectors 150 may be arranged in racks physically close to the racks at which hosts 112 are housed), the number of path selectors per rack, the number of distinct input and/or output ports at each path selector, the performance capabilities (e.g., bandwidth and/or latency) of the physical links leading into and/or out of the nodes, and so on. In some embodiments, the outer layer path selectors may be referred to as "bricks" and the inner layers may be referred to collectively as a "fabric". In other embodiments, path selectors used for various interconnect layers may have similar capabilities, e.g., each of the path selectors of the internal network 166 may be identical. Various different types of topologies may be used for the network interconnect in different embodiments, such as "fat trees", VL2 topologies, BCubes, high radix network fabric topologies, or various other types of topologies based on Clos networks.

Within the internal network 166, at least a subset of the path selectors 150, 152 or 154 may be configured to use a shuffle sharding policy to transmit packets received from traffic sources (such as source application 125A at source host 112A) towards their destinations (such as destination application 125L at destination host 112B). Thus, for example, path selector 150B may receive a packet P generated at source host 112A (e.g., by VMC 115A on behalf of instance 120A at which the source application 125A runs). In at least some embodiments, path selector 150B may perform (e.g., in hardware) one or more computations to classify P as belonging to a particular packet flow category (PFC). Such categorization may be based on any of various factors in different embodiments, such as the source/destination IP addresses indicated in P, the source/destination ports, the source/destination MAC (media access control) addresses, a local randomization factor specific to path selector 150B, and so on. The path selector 150B may then identify a candidate outbound link set (COLS) for that PFC, e.g., by looking up a PFC-to-COLS mapping entry. The COLS may comprise some combination of outbound links available at path selector 150B that are usable to transmit P towards the destination host 112B. For example, in one implementation, path selector 150B may be a switch with 64 output ports, each with a respective link to a respective path selector 152 at the second tier of the network interconnect.

The first layer of path selectors (comprising path selector 150B) may have been configured to use COLSs of size 8, so a subset of 8 outbound links may be identified as candidates for transmitting P to a particular path selector 152. Path selector 150B may then identify a particular one of those candidate outbound links as the one to use for P, and transmit P on that selected link. The decisions made at path selector 150B for packet P may be made in a stateless manner in the depicted embodiment, i.e., independently of the decisions made for any other packet (of the same packet flow category or of a different packet flow category) received earlier or later than P. At the next layer (and subsequent layers until P reaches the last layer of internal network 166), a similar set of decisions may be made (potentially with a different COLS size and/or a different selection policy within a COLS) for selecting the outbound link to be used for forwarding P. It is noted that although edge device 142 is shown in FIG. 1 as an intermediary between an external network 155 and path selectors of the internal network at which shuffle sharding may be used, in at least some embodiments path selection based on shuffle sharding may be performed at the first device encountered within the provider network 101 by a packet originating at an external network 155 (e.g., edge devices themselves may select outbound links for received packets using shuffle sharding).

Using the approach described above, tradeoffs may be made between potentially competing sets of goals for internal network 166, such as a first goal to distribute traffic as evenly as possible among the path selectors at any given layer, and a second goal to isolate the impact of individual link failures and/or path selector failures to as few (source/destination) pairs as possible. The COLSs identified for different packet flow categories at a given path selector may overlap at least partially in some embodiments, so that the same outbound link may be used for packets belonging to several different packet flow categories. The mappings between PFCs and COLSs may be generated a priori and stored at the path selectors (e.g., in a memory component that can be accessed efficiently) prior to the actual use of the mappings in some embodiments. Combinatorial algorithms that take the number of output ports available, failure isolation goals, load balancing goals, expected packet arrival rates, and/or other parameters of the traffic flow as input may be used to generate the mappings in some embodiments. In one implementation, configuration files that indicate various details of the way that packets are to be mapped to PFCs, the mappings between PFCs and COLSs, and the selection algorithms to be used within COLSs, may be stored at some or all of the path selectors.

Packet Distribution Overview

Figure 2:
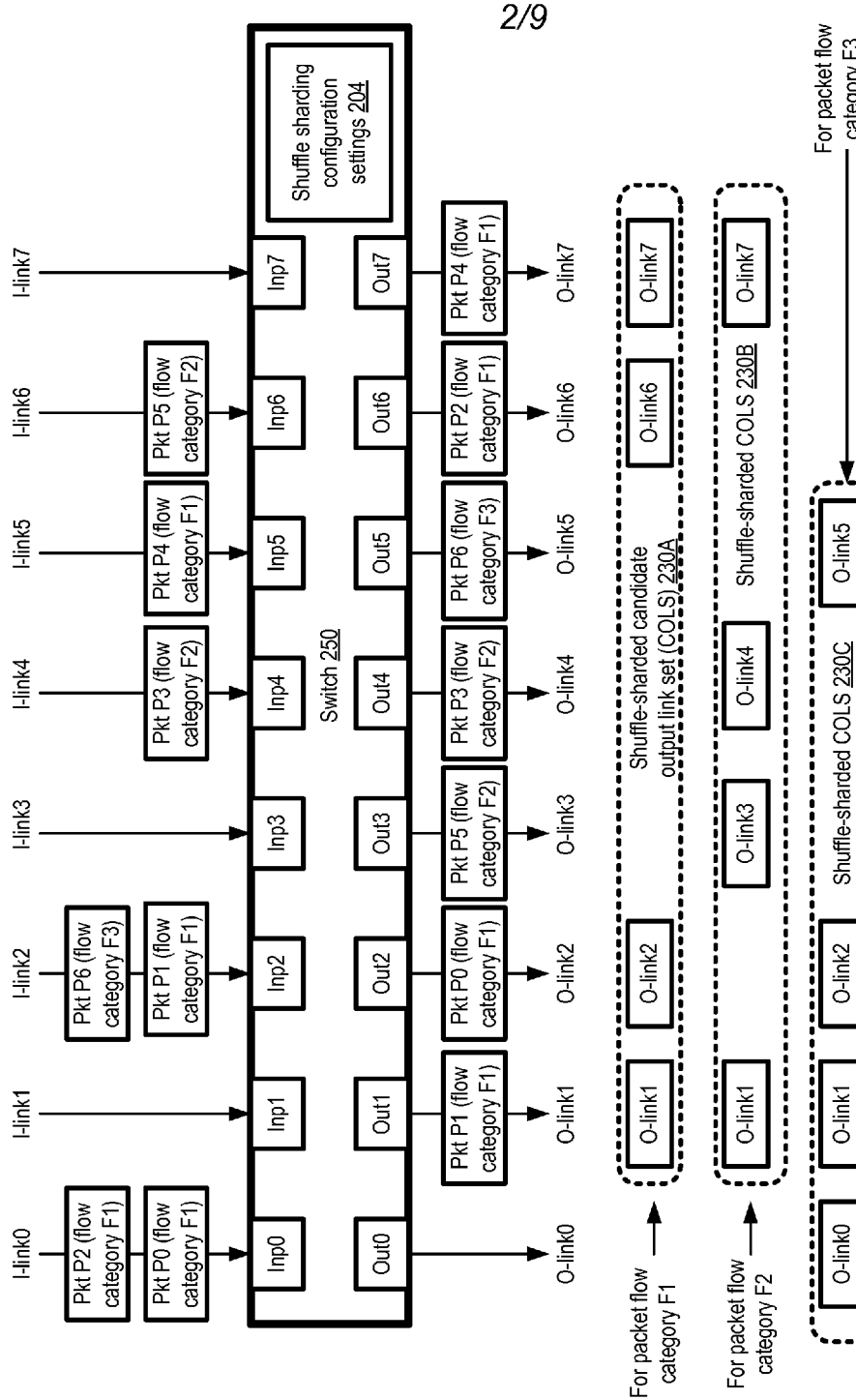
FIG. 2 illustrates an example network switch in which received packets belonging to a particular flow category are distributed among a selected subset of output links, according to at least some embodiments.

As mentioned above, in at least some embodiments, devices such as network switches or storage switches may be used as path selectors. FIG. 2 illustrates an example network switch 250 in which received packets belonging to a particular flow category are distributed among a selected subset of output links, according to at least some embodiments. Devices similar to switch 250 may be used at one or more of the layers of internal network 166 shown in FIG. 1 in some embodiments. As shown, switch 250 includes eight input ports Inp0 through Inp7 for respective inbound links I-link0 through I-link7 connecting switch 250 to other path selectors (or to traffic sources such as hosts 112). Also, switch 250 includes eight output ports Out0 through Out7, each used for a respective outbound link O-link0 through O-link7 to other path selectors (or to traffic destinations such as hosts 112). It is noted that although eight input ports and eight output ports are shown at switch 250, in general, a given path selector switch may have any appropriate number of input and output ports; in practice, as mentioned earlier, switches with 48, 64, 128 (or even more ports) of each type may be used. Further, the number of input ports need not necessarily be the same as the number of output ports in at least some embodiments. Not all the input ports or output ports may be connected to other devices at a given point in time; for example, in some internal networks, while the switches used may have 64 output ports, only 32 of the 64 output ports may be used within a particular deployment (with the remaining 32 reserved for later expansions of the deployment). In some embodiments, several of the outbound links of a given switch 250 may be attached to respective input ports of a different device—thus, not all the outbound links from a given switch need necessarily be connected to different devices.

A number of different packets are received at switch 250 in the depicted example, to be directed via selected outbound links of the switch towards their destinations. Each of the received packets may be classified at switch 250 as belonging to a corresponding packet flow category such as F1, F2 or F3, and a candidate outbound link set (COLS) may be identified for packets belonging to each packet flow category in accordance with shuffle sharding configuration settings 204 in the depicted embodiment. In at least one embodiment, the configuration settings 204 may be indicated in a file, locally stored at the switch or accessible from the switch, which can be modified be network administrators. The packets of a given flow may arrive at switch 250 via one or more inbound links. Thus, for example, packets P0 and P2 of flow category F1 arrive via I-link0, packet P1 of flow category F1 arrives via I-link2, and packet P4 (also of flow category F1) arrives via I-link5. Packet P3 of flow category F2 arrives via I-link4, packet P5 of flow category F2 arrives via I-link6, and packet P6 of flow category F3 arrives via I-link2.

In the example shown in FIG. 2, three shuffle sharded candidate outbound link sets (COLSs) 230 are shown, one for each of the flow categories F1, F2 and F3. For F1, COLS 230A includes links O-link1, O-link2, O-link6, and O-link 7. For F2, COLS 230B includes links O-link1, O-link3, O-link4, and O-link7, while for F3, COLS 230C includes links O-link0, O-link1, O-link4, and O-link5. Other COLSs, not shown, may be set up for additional flow categories in the depicted embodiment. The sizes and members of the different COLS may be determined based at least on shuffle sharding configuration settings 204 in the depicted embodiment. As indicated in FIG. 2, different COLSs may overlap in at least some embodiments, with a given outbound link potentially being designated as a member of several different COLSs (for example, O-link1 belongs to COLSs 230A, 230B and 230C). In some embodiments, not all the COLSs at a given packet selector may have the same number of members—e.g., it may be the case that for some packet flow categories, more outbound ports may be included as candidates than for other packet flow categories.

After the COLS corresponding to a particular packet's flow category is determined, the switch 250 may select a particular member of the COLS as the one to use for transmitting that packet. Thus, for F1 packets P0, P1, P2 and P4, outbound links O-link2. O-link1, O-link6 and O-link7 of COLS 230A respectively may be used. For F2 packets P3 and P5, O-link4 and Olink3 of COLS 230B are used, and for packet P6 of category F3, O-link5 is used in the depicted example. A number of different techniques may be use to select individual members of a COLS for successive packets of a given flow category in various embodiments, as described below in the context of FIG. 4.

It is noted that in various embodiments, the number of possible PFCs into which packets received over a time interval are classified may be higher than the number of COLSs into which the outbound links of the packet selector are arranged. As a consequence, in at least some embodiments, packets belonging to several different PFCs may be transmitted using the same COLS.

Switch Subcomponents Implementing Shuffle Sharding Based Packet Distribution

Figure 3:
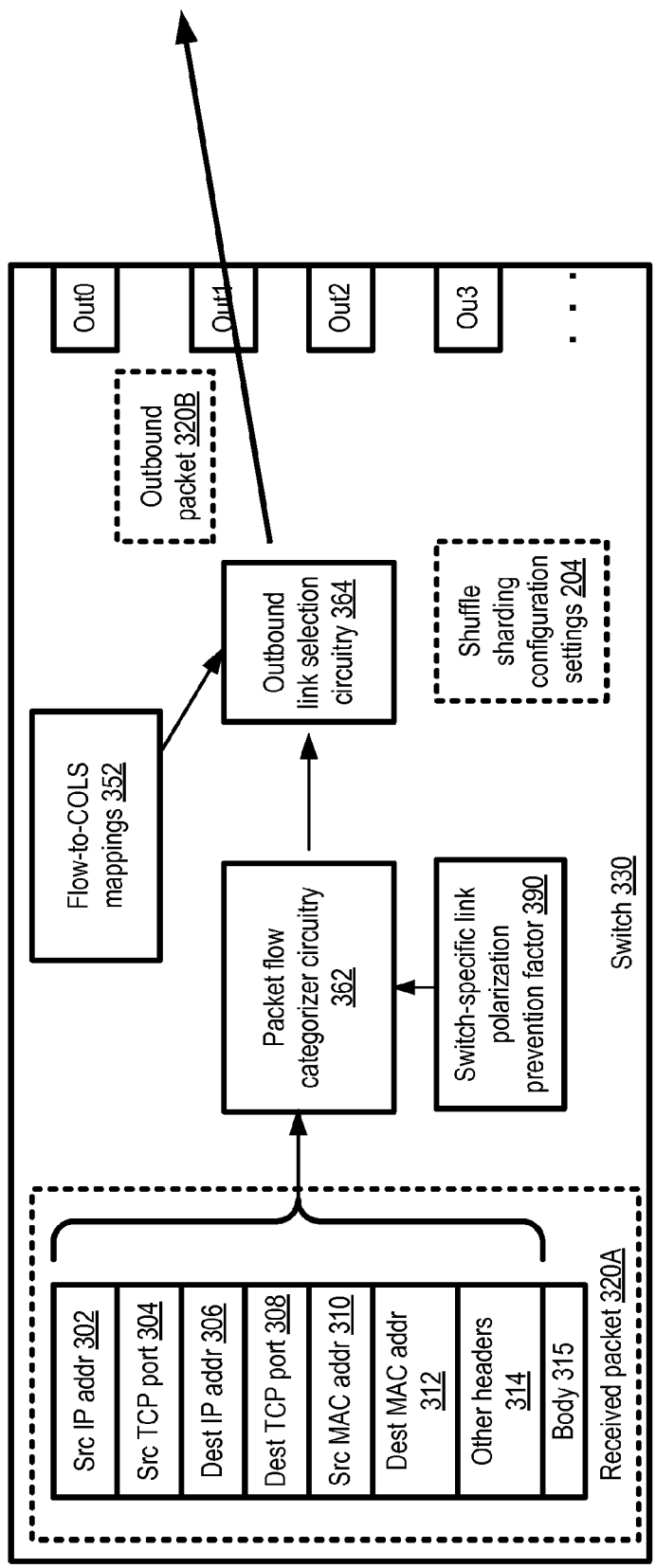
FIG. 3 illustrates example subcomponents of a network switch involved in packet distribution, according to at least some embodiments.

FIG. 3 illustrates example subcomponents of a network switch involved in packet distribution, according to at least some embodiments. As shown, at switch 330, one or more headers of a received network packet 320A may be provided as input to packet flow categorizer circuitry 302. By way of example, a subset of headers that may be used for various protocols of the TCP/IP family of protocols is shown in FIG. 3, although headers used for other protocols may be used in various embodiments for packet categorization. In the depicted example, some combination of the following headers may be used: the source IP address 302, the source TCP port 304, the destination IP address 306, the destination TCP port 308, the source MAC address 310, the destination MAC address 312, and/or other headers 314. In some embodiments, in order to ensure that all the packets belonging to a particular logical flow (e.g., a particular TCP connection) are transmitted using the same COLS, a combination of packet headers that remain invariant for all the packets of the logical flow may be used as input to the packet flow categorization circuitry 302. In one implementation, a fast non-cryptographic hash function may be used to identify the flow category for a given packet based on the combination of headers being considered. The set of headers to be used for flow categorization may be indicated in the shuffle sharding configuration settings 204. In some implementations, a given switch 330 may be configured to classify each incoming packets into a selected one of a finite set of PFCs (e.g. F0, F1, . . . , F1023 in a 1024-category scenario). As a result, in such scenarios, packets belonging to several different TCP connections may end up being placed in the same PFC.

After the flow category has been determined for the received packet 320A, the COLS to be used for that category may be determined, e.g., using Flow-to-COLS mappings 352 in the depicted embodiment. In other embodiments, instead of being generated and stored beforehand, the COLS for a particular flow category may be computed on the fly. The outbound link selection circuitry 364 may then select the specific outbound link or port to be used from among the candidates, and direct the outbound version 320B of the received packet accordingly. In the depicted example, outbound packet 320B is transmitted via output port Out1 (selected from among output ports Out0, Out1, Out2, Out3 etc.).

In the depicted embodiment, an element of randomization may be introduced into the categorization of packets (and/or the selection of a COLS for a flow category) using a switch-specific link polarization prevention factor 390. If all the switches in a given internal network used the same logic to map packets to flows and flows to COLSs, the traffic flowing through the network may end up being unbalanced (e.g., all switches may use the same output port for a given source and destination pair with very high traffic levels). As indicated by the phrase "switch-specific", the link polarization prevention factors may differ from one switch to another, and may therefore result in different COLSs being selected for the same combination of packet parameters at different switches, thus further reducing the likelihood of load imbalance.

It is noted that although different subcomponents 362 and 364 are shown for classifying packets and for selecting outbound links in the example switch 30 of FIG. 3, in some implementations common circuitry may be used for both tasks. In at least some embodiments, as mentioned above, the mappings between flow categories and candidate outbound link sets may not be stored as indicated in FIG. 3, but may be determined dynamically. In embodiments in which software-based path selectors are used, the packet flow categorization and output link selection tasks may be performed using respective software modules or a single software module.

Figure 4:
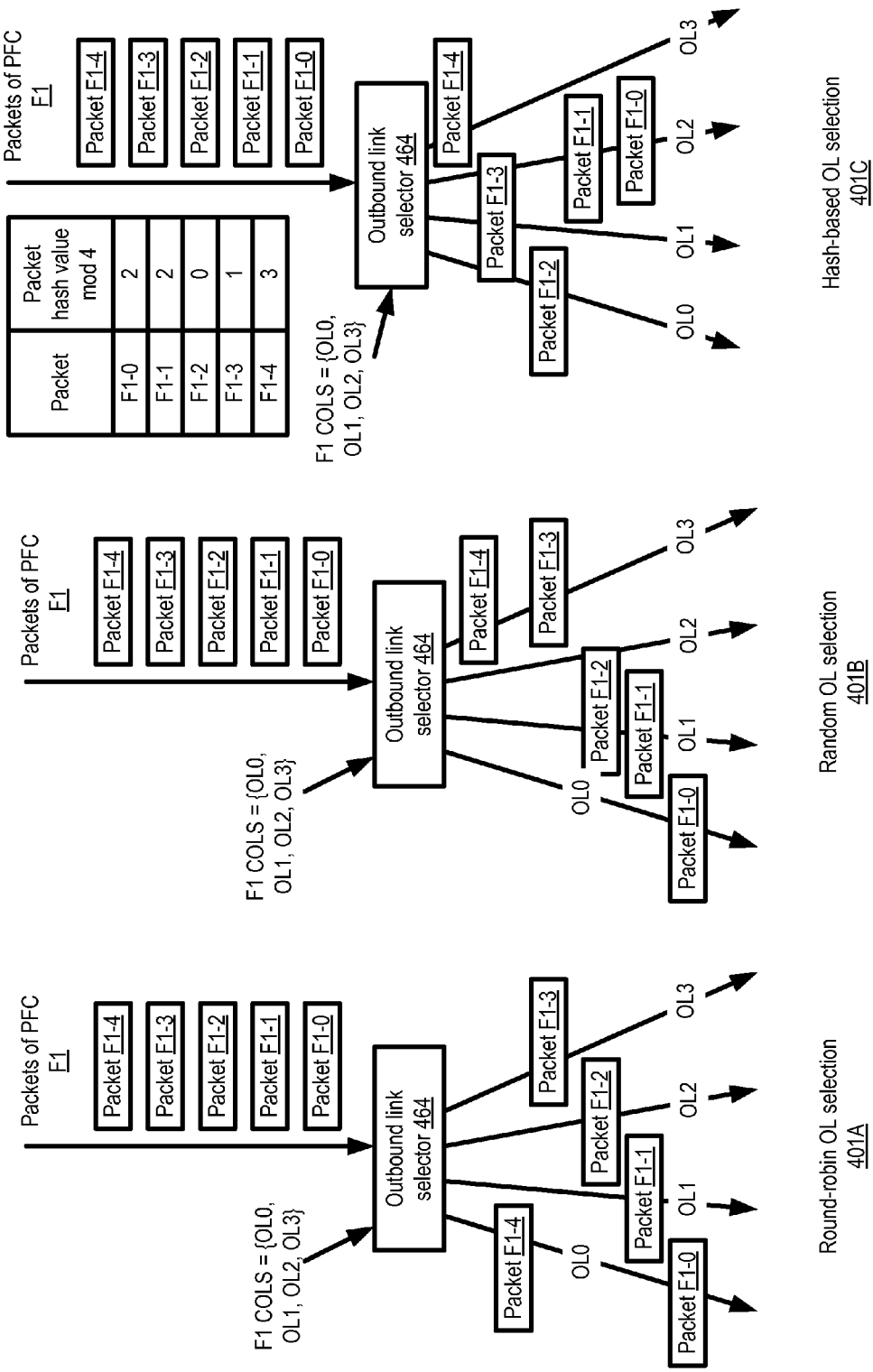
FIG. 4 illustrates example alternative approaches to selecting a particular outbound link for packets belonging to a flow category, according to at least some embodiments.

FIG. 4 illustrates example alternative approaches to selecting a particular outbound link for packets belonging to a flow category, according to at least some embodiments. Three choices for selecting the outbound link are shown for five successive packets F1-0, F1-1, F1-2, F1-3 and F1-4 of a single flow category F1: round robin selection 401A, random selection 401B, and hash-based selection 401C. In each case, the same set of four candidate outbound links is identified by the packet selector for the flow category F1: {OL0, OL1, OL2, OL3}. The particular technique to be used at a given switch may be indicated in the shuffle sharding configuration settings 204 in at least some embodiments.

In round-robin selection 401A, the outbound links of the COLS are selected in order as new packets of the flow arrive, with the least recently used outbound link being re-selected after each of the links has been used in any given iteration. Thus, F1-0 is transmitted via OL0, F1-1 via OL1, F1-2 via OL2, F1-3 via OL3, and then OL0 is used for F1-4. In contrast, when using random selection 401B, an outbound link may be selected independently of the order in which links have been used previously—thus, for example, F1-0 may be transmitted via OL0, F1-1 via OL2, F1-2 also via OL2, F1-3 via OL3, and F1-4 also via OL3. In the hash-based approach 401C, a hash value based on at least a portion of the contents (e.g., the body, the headers, the whole packet, or some subset of the headers and body) of the received packet may be computed, and that hash value may be used to select the outbound link. In the illustrated example, where a particular outbound link is to be selected from a set of four links, the hash value modulo 4 is computed for each of the packets and is then used to identify the target outbound link. Using this approach, F1-0 and F1-1 are transmitted via OL2, F1-2 is transmitted via OL0, F1-3 is transmitted via OL1 and F1-4 is transmitted via OL3.

In some embodiments, outbound links may be selected based on performance metrics. For example, if a path selector is able to determine the latency (e.g., averaged over some number of successive packet transmissions) of packet transmissions over the different candidate outbound links, the outbound link that has the smallest currently-known latency may be selected for a newly received packet.

COLS Size Tradeoffs

Figure 5:
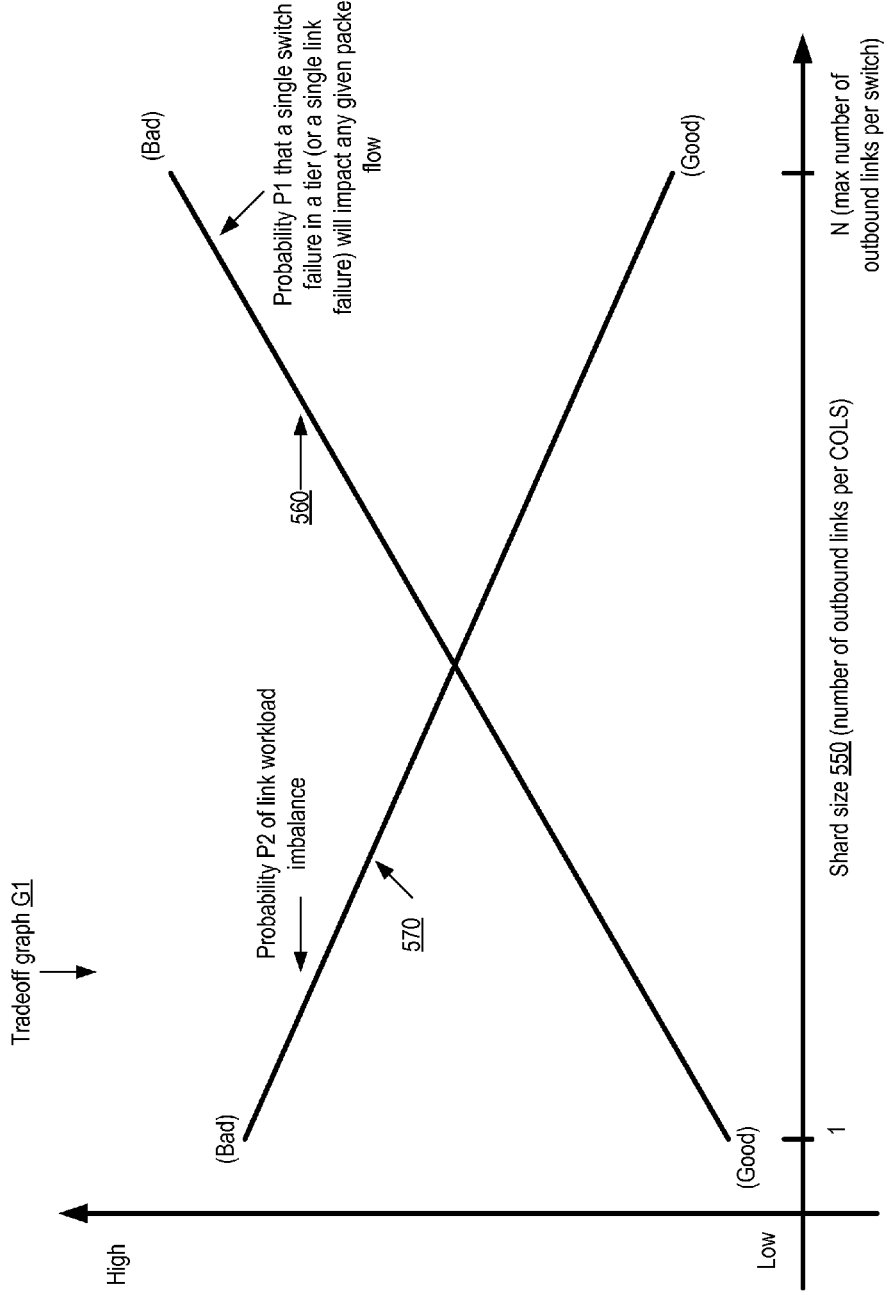
FIG. 5 illustrates tradeoffs associated with choosing candidate output link set sizes at path selectors of a network, according to at least some embodiments.

As mentioned earlier, in many modern switch devices the total number of outbound links or output ports available may be quite large (e.g., 64 or 128). When determining the shuffle sharding parameters (such as the number of outbound links to be included in a given COLS) to be used at a given data center, or when deciding the types of switches that should be used, network operators may have to consider a number of factors. FIG. 5 illustrates tradeoffs associated with choosing candidate output link set sizes at path selectors of a network, according to at least some embodiments. It is noted that the graph shown in FIG. 5 is intended to represent qualitative trends in the relationships between the COLS size chosen and traffic characteristics that may be at least somewhat dependent on the COLS size, and is not intended to indicate precise quantitative effects. To further simplify the discussion, each of the path selectors at each of the tiers of the internal network is assumed to have the same number (N) of output ports, so that a maximum of N outbound links are available at each path selector.

On the X-axis of tradeoff graph G1, the number of outbound links 550 that may in principle be included in a given COLS increases from 1 to N. Curve 560 represents the probability P1 that a single switch failure in any given tier (or a failure of one link) will impact any given packet flow between a particular source and a particular destination. At one extreme, with a COLS size of 1, out of a set of N packet flows, N−1 are likely to remain unaffected by a single failure, so the probability P1 is low. At the other extreme, when all switches and all links are used for all the flows, each flow may be affected by any given failure, so P1 is high.

Curve 570 of graph G1 indicates the probability P2 of link workload imbalance. Of course, workload imbalance may depend on a number of additional factors, such as the sizes of different packets, the temporal distribution of packets, and so on. In general, however, the higher the COLS size, the less likely link imbalance becomes (assuming that the workload is distributed fairly uniformly within each COLS). With a COLS size of 1, a single high-bandwidth flow may severely overload an outbound link, while with a COLS size of N, all the links may be used for any given flow, regardless of the rate or size of packets received.

As shown in FIG. 5, fault isolation characteristics may tend to improve with smaller COLS sizes, while link workload balance characteristics may tend to improve with larger COLS sizes. In practice, in at least some embodiments, network operators may set the shuffle sharding parameters (e.g., COLS sizes as well as the outbound link selection policies within COLSs) in an iterative manner, based for example on ongoing analysis of various types of metrics that may be collected at their internal interconnects. For a given internal network, for example, a traffic analysis may be performed initially to identify expected packet sizes and arrival rates. In combination with statistics regarding the failure rates of various path selectors and/or or links, an initial COLS size may be identified (or, in some cases, a group of COLS sizes may be identified for different types of traffic or for different tiers of the internal network). The path selectors at various tiers of the network may be configured accordingly, e.g., using configuration files stored locally or via administrative tools such as remote management consoles. Metrics on utilization levels, latencies, etc. may be collected, and the configuration settings may be adjusted over time if necessary.

Multi-Tier Path Selectors

Figure 6:
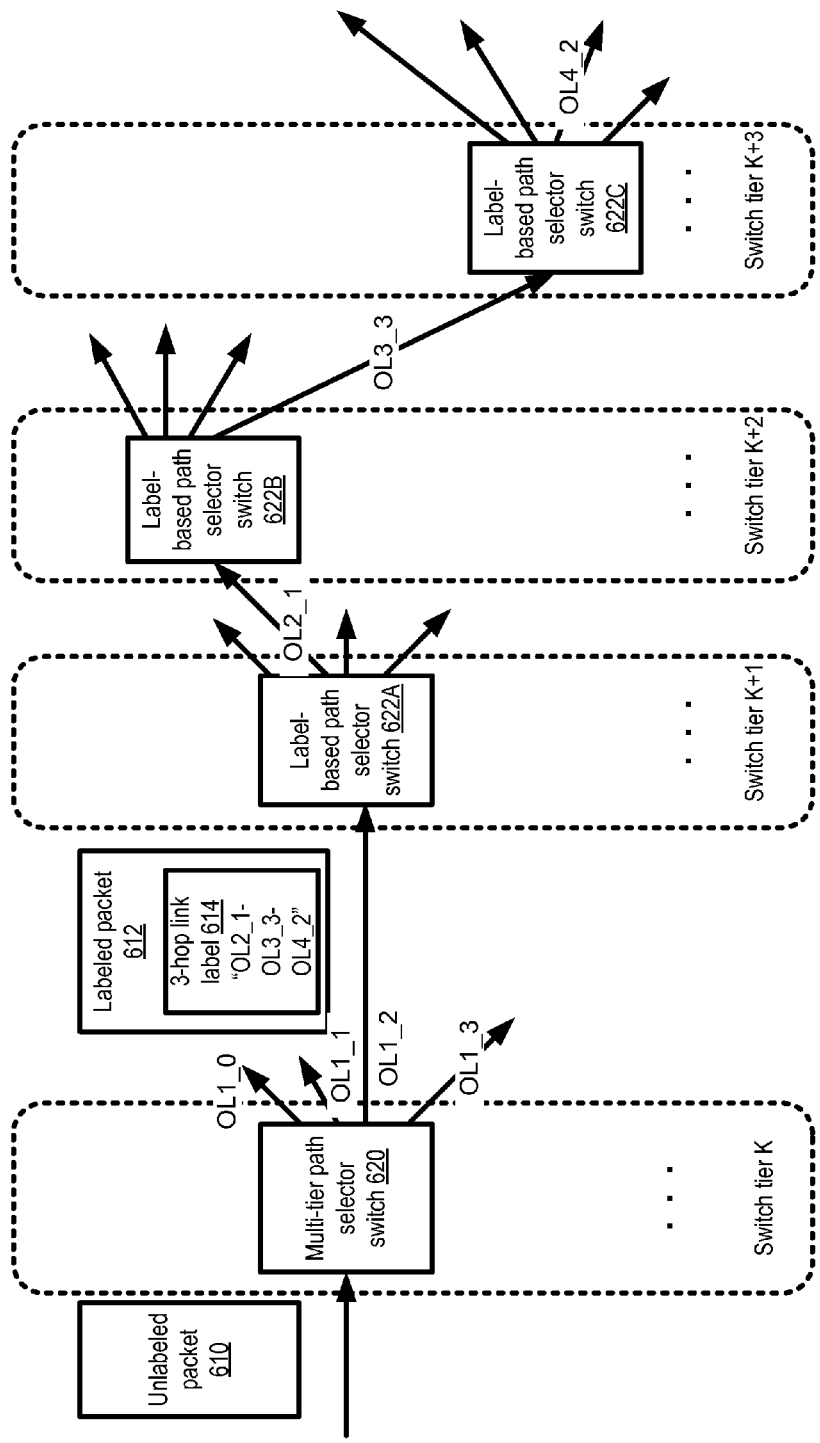
FIG. 6 illustrates an example of a switch that is configured to select packet paths for multiple tiers of an interconnect topology, according to at least some embodiments.

In some embodiments, instead of making local decisions that affect only a single hop along a packet's route to its destination, a given path selector may make decisions for several hops or links at a time. FIG. 6 illustrates an example of a switch that is configured to select packet paths for multiple tiers of an interconnect topology, according to at least some embodiments.

In the depicted embodiment, the internal network topology comprises at least four tiers of switches: tiers K, K+1, K+2 and K+3. Switch tier K may include a number of multi-tier path selector switches 620, while tiers and K+1, K+2, K+3 include label-based path selector switches. Multi-tier path selector switches 620 may assign labels to incoming packets (such as unlabeled packet 610), indicating the particular outbound links to be used for the packet as it is transmitted through some number of tiers. In the illustrated example, switch 620 generates a 3-hop link label 614, indicating that the packet is to be transmitted via outbound link OL2_1 at tier K+1, outbound link OL3_3 at tier K+2, and outbound link OL4_2 at tier K+3. In order to generate label 614, in some embodiments, switch 620 may utilize shuffle sharding configuration settings for its own tier as well as corresponding settings for the three succeeding tiers of the network. For example, switch 620 may determine the packet flow category of unlabeled packet 610 using similar techniques to those discussed earlier, and then identify respective COLSs for tier K (to be used to select the particular outbound link to be used for the packet at switch 620 itself), tier K+1, tier K+2 and tier K+3.

Labeled packet 612, which includes the 3-hop-link label 614 together with the contents of the unlabeled packet 610, may be propagated by switch 620 along a selected outbound link OL1_2 to switch 622A at tier K+1. Switch 622A may simply examine the label 614 and transmit the received labeled packet along OL2_1, without having to select a COLS or perform any of the other computations that would be needed if the label were not provided by switch 620. Similarly, switch 622B at tier K+2 may use the label contents to transmit the packet via OL3_3 to switch 622C, and switch 622C may use the label to transmit the packet via OL4_2.

At least in some embodiments, multi-tier path selection may be performed at several tiers of the internal network. Thus, in the example scenario illustrated in FIG. 6, a second multi-tier path selection switch may receive the packet transmitted via OL4_2, and make decisions regarding some number of succeeding tiers. In some embodiments, the resources required for path selection (e.g., the amount of memory needed to store possible label choices, and/or the amount of computation needed to determine the labels) may increase with the number of tiers for which decisions have to be made. In some implementations, one of the shuffle sharding parameters that can be used to configure a path selector may indicate the number of successive tiers for which path selection is to be performed. Such a parameter may be adjusted as needed in some embodiments, e.g., based on the depth (number of tiers) of the internal network and the resources available at the individual multi-tier path selectors.

Path Selection at Virtualization Management Software Stacks

Figure 7:
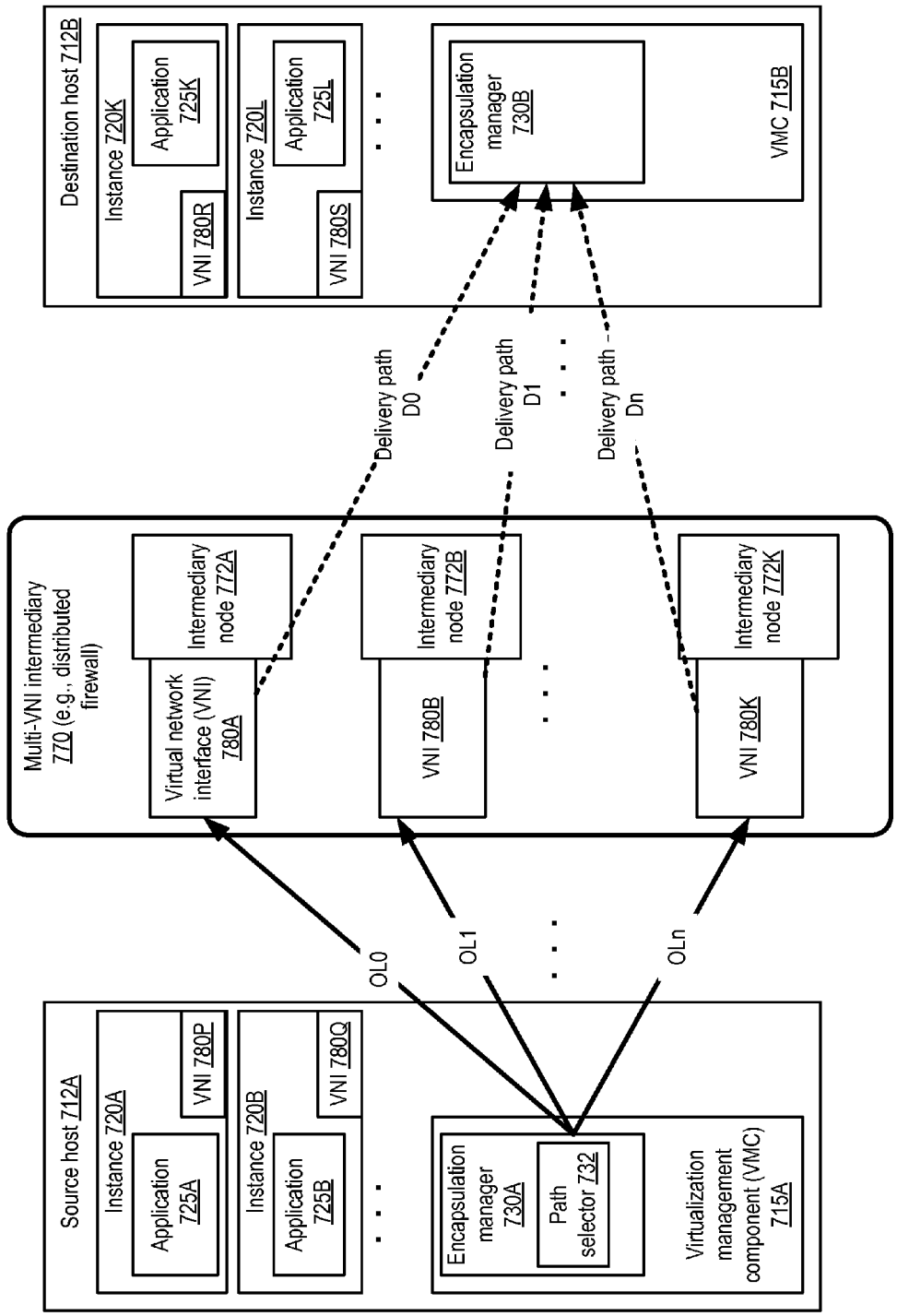
FIG. 7 illustrates an example configuration in which a virtualization management component of an instance host implements path selection for outbound packets, according to at least some embodiments.

As mentioned earlier, techniques similar to those that can be used to select outbound links at network switches may also be implemented in other components of a provider network in at least some embodiments. FIG. 7 illustrates an example configuration in which a virtualization management component of an instance host implements path selection for outbound packets, according to at least some embodiments. In the embodiment depicted in FIG. 7, a provider network may enable the configuration of virtual network interfaces (VNIs) 780 for client-owned as well as service-owned compute instances. A VNI may comprise a logical entity with a set of networking and security-related attributes that can be attached to (or detached from) a compute instance programmatically. For example, at least one IP (Internet Protocol) address "IPaddr1" may be assigned to a given virtual network interface such as 780P, and security rules restricting inbound and outbound traffic may be set for VNI 780P. When VNI 780P is programmatically attached to a given compute instance such as instance 720A launched at an instance host such as source host 712A, network packets indicating IPaddr1 as their destination address (and complying with the security rules) may be received at 720A via a physical network interface card (NIC) of the host 712A. In addition, outbound packets generated at instance 720A (e.g., by an application 725A) may indicate IPaddr1 as their source address and may be physically transmitted towards their destinations via host 712A's NIC. If VNI 780P is then programmatically detached from instance 720A and attached to a different instance 720X (which may be executing at a different instance host, not shown in FIG. 7), the IPaddr1 traffic that was previously being received at instance 720A may now be received at instance 720X, with the same security rules in place. Similarly, outbound packets from 720X may indicate IPaddr1 as their source address. Support for virtual network interfaces may considerably simplify network configuration tasks for customers using the virtual computing service.

In at least some embodiments, virtualization management components (VMCs) such as VMC 715A may encapsulate the packets originally generated at a host's instances for transmission to their intended destinations. For example, part or all the contents of a baseline packet generated at a source instance such as 720A (and directed to instance 720K at destination host 712B) may be included in the body of an encapsulation packet by an encapsulation manager 730A, and encapsulation headers indicating the source VMC 715A and the destination VMC 715B (or the source host 712A and the destination host 712B) may be generated for the encapsulation packet. A corresponding encapsulation manager 730B at the destination host may eventually extract the baseline packet which was directed to an instance such as 720K (using an IP address of the attached VNI 780R as the destination address). As mentioned earlier, VMCs 715 may include hypervisors and/or administrative operating systems in various embodiments.

In the depicted embodiment, packets from source host 712A may have to pass through a multi-VNI intermediary device 770. For example, the source and destination applications (725A and 725K respectively) may be located on opposite sides of a firewall implemented as a cluster of nodes. Other types of network processing operations may be performed by intermediary devices with multiple VNIs in various embodiments, such as request routing, load balancing and the like. In the depicted embodiment, an intermediary device 770 may include a plurality of nodes 772 (such as nodes 772A-772K), several or all of which may have respective VNIs 780 (e.g., 780A-780K) attached to them. As a result, in such embodiments, several paths or links (such as OL0-OLn in FIG. 7) may be available from the source VMC 715A to transmit any given encapsulation packet to the multi-VNI intermediary 770. In such a scenario, the source VMC may include a path selector subcomponent 732, which performs similar functions as the switch path selectors discussed earlier. For example, using a set of shuffle sharding settings of the source VMC, path selector 732 may identify a flow category to which a given encapsulation packet belongs (e.g., based on various headers of the corresponding baseline packet), identify a set of candidate outbound links for the encapsulation packet, and select one of the outbound links to be used to transmit the packet to the intermediary 770. From the intermediary node selected, the encapsulated packet may be sent to the destination host via the appropriate delivery path (which may include one or more links), such as delivery path D0 from the intermediary node 772A, delivery path D1 from intermediary node 772B, and so on. In some embodiments, several different intermediary devices, each with multiple VNIs, may have to be traversed before a packet reaches its destination host. In such embodiments, shuffle sharding may be used to select outbound links at one or more of the intermediary devices as well as at the source VMC.

Methods for Shuffle Sharding Based Path Selection

Figure 8:
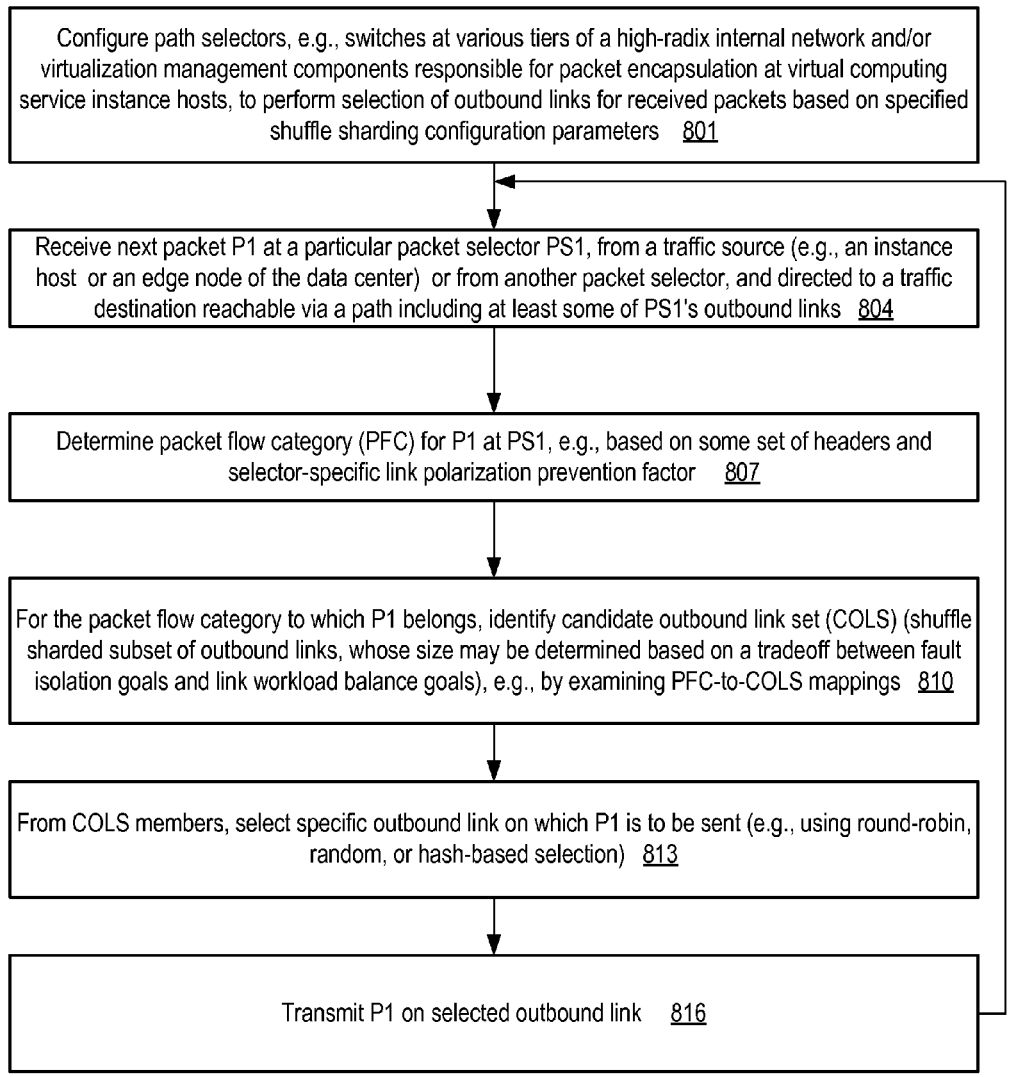
FIG. 8 is a flow diagram illustrating aspects of operations that may be performed at a path selector to select outbound links for received packets, according to at least some embodiments.

FIG. 8 is a flow diagram illustrating aspects of operations that may be performed at a path selector to select outbound links for received packets, according to at least some embodiments. As shown in element 801, at least a subset of the path selectors of an internal network of a data center may be configured to perform selection of outbound links for received packets based on a set of shuffle sharding configuration parameters. The path selectors may include, for example, tiered switches used to implement a high-radix interconnect and/or a set of virtualization management components responsible for packet encapsulation at instance hosts of a virtual computing service. In at least some embodiments, configuration settings such as the sizes of the candidate outbound link sets (COLS) and the policy to be used to select particular outbound links from a COLS may be set by modifying configuration files on the switches or instance hosts, or using an administrative console. In some embodiments in which switches are used as packet selectors, each switch that is to determine outbound links for one or more tiers of the internal network may comprise circuitry to classify packets into flows, to identify COLSs for flows, and/or to select the particular outbound link from within a COLS for a given packet. In other embodiments, one or more of the packet classification, COLS identification, and outbound link selection tasks may be performed at software modules.

After the path selectors have been configured, they may be activated to start handling incoming traffic. A particular packet P1 may be received at a given path selector PS1, e.g., either from a traffic source within the provider network such as an instance host or an edge node, or from another packet selector (element 804). The packet flow category (PFC) for P1 may be determined, e.g., based on an analysis of some set of headers of the packet and/or on a selector-specific link polarization prevention factor (element 807).

For the PFC to which P1 belongs, a COLS may be identified (element 810), e.g., using stored PFC-to-COLS mappings or using on-the-fly computations. Each COLS may include a subset of M links of the total available output links N from the path selector, with the memberships of different COLS selected using a combinatorial algorithm in some implementations. In some embodiments, COLS size(s) may be determined (and indicated in the path selector configuration settings) based on tradeoffs between fault isolation goals and link workload balancing goals of the provider network in some embodiments. In at least one embodiment, COLSs of different sizes may be used for different PFCs. In some embodiments, even though the number of distinct COLSs into which the outbound links of a path selector may be arranged may be quite large, the number of PFCs into which packets may be classified may be greater than the maximum number of distinct COLSs. In such embodiments, a given COLS may be used for packets belonging to multiple PFCs, either concurrently or at different points in time. In other embodiments, all incoming packets may be classified into one of a relatively small set of allowed PFCs, such that the traffic flowing over the links of a given COLS always belongs to the same PFC.

From the COLS identified for the packet P1, a particular outbound link may be selected using any of a variety of approaches (such as random selection, round-robin selection, or hash-based selection) in different embodiments (element 813). P1 may then be transmitted along the selected outbound link (element 816). Operations corresponding to elements 804-816 may be performed for each received packet. In at least some embodiments, the workload of a PFC may be distributed uniformly or near-uniformly among the COLS members.

It is noted that in various embodiments, operations other than those illustrated in the flow diagram of FIG. 8 may be used to implement at least some of the techniques for supporting shuffle sharding based path selection. Some of the operations shown may not be implemented in some embodiments, may be implemented in a different order than illustrated in FIG. 8, or in parallel rather than sequentially.

Use Cases

The techniques described above, of selecting subsets of outbound links to be used at switches and other path selectors for packets belonging to a given logical flow, and distributing the traffic of that logical flow among the subset members, may be used in a variety of network environments. In large data centers with multi-tier high-radix internal networks (with topologies based on fat trees, Clos networks and the like), using shuffle sharding for path selection may help to improve fault isolation, while keeping link workload imbalance low and switch utilization high. Similar techniques may also be applied, with similar benefits, at virtualization management components or other software components of a network where multiple paths are available between given pairs of traffic sources and destinations.

Illustrative Computer System

Figure 9:
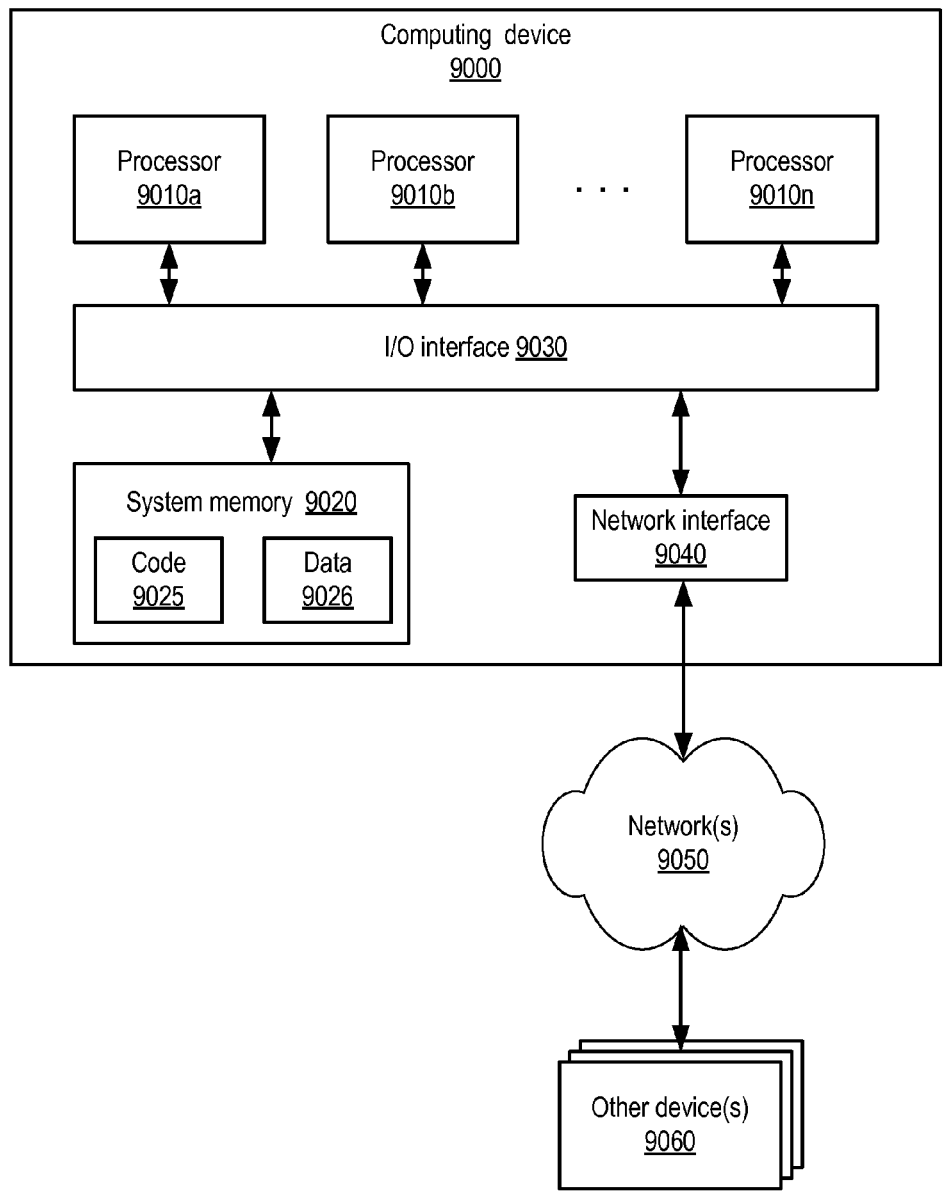
FIG. 9 is a block diagram illustrating an example computing device that may be used in at least some embodiments.

In at least some embodiments, a server that implements one or more of the path selection techniques described above may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a plurality of path selectors of a network, including a particular path selector from which a plurality of outbound links are available for transmitting network packets received at the particular path selector;
    wherein the particular path selector is configured to:
        receive or determine a mapping between a plurality of packet flow categories and a plurality of candidate outbound link sets of the particular path selector, wherein the mapping indicates respective numbers of outbound links corresponding to respective candidate outbound link sets (COLS), wherein the respective numbers of outbound links are determined based at least in part on characteristics of the network, and wherein the respective numbers of outbound links are smaller than a number of the plurality of outbound links available from the particular path selector;
        identify, based at least in part on one or more headers of a particular network packet received from a particular traffic source and directed to a particular traffic destination, a first packet flow category (PFC) to which the particular network packet belongs;
        determine, based at least in part on the mapping between the plurality of packet flow categories and the plurality of candidate outbound link sets, the first COLS mapped to the first PFC, wherein the first COLS includes at least a first outbound link of a first path to the particular traffic destination and a second outbound link of a second path to the particular traffic destination;
        select a particular outbound link of the first COLS on which the particular network packet is to be transmitted from the particular path selector;
        transmit the particular network packet on the particular outbound link; and
        subsequent to a determination that a different network packet received at the particular path selector belongs to the first PFC,
            select another outbound link of the first COLS based at least on the other outbound link of the first COLS being different than the particular outbound link of the first COLS, wherein the different network packet is to be transmitted on the other outbound link of the first COLS; and
            transmit the different network packet on the other outbound link.

2. The system as recited in claim 1, wherein the mapping between the PFCs and the COLs is based on fault isolation characteristics of the network and on the workload balance of traffic over the network, and wherein the plurality of path selectors is arranged in one of: a fat tree topology, a VL2 (Virtual Layer 2) topology, a BCube topology, or a different Clos topology.

3. The system as recited in claim 1, wherein the particular path selector is further configured to:
    determine that another network packet received at the particular path selector belongs to a second PFC;
    identify a second COLS corresponding to the second PFC, wherein at least one outbound link of the second COLS is also included in the first COLS and at least one outbound link of the second COLS is not included in the first COLS; and
    transmit the other network packet on an outbound link of the second COLS.

4. The system as recited in claim 1, wherein the particular path selector comprises a network switch device, wherein the number of outbound links available from the particular path selector is no greater than a number of output ports of the network switch device.

5. The system as recited in claim 1, wherein the particular path selector is further configured to determine at least one of: (a) the first PFC, (b) the first COLS, or (c) the particular outbound link using a parameter stored in a configuration file accessible from the particular path selector.

6. A method, comprising:
    performing, by a particular path selector of a plurality of path selectors of a network, wherein a plurality of outbound links are available for transmitting network packets received at the particular path selector:
        identifying, in response to receiving a particular network packet from a particular traffic source and directed to a particular traffic destination, a first packet flow category (PFC) to which the particular network packet belongs;
        determining a candidate outbound link set (COLS) corresponding to the first PFC, wherein the COLS includes at least a first outbound link and a second outbound link, wherein the COLS includes a number of outbound links that is based at least in part on a probability of a network failure between a particular source and a particular destination, and wherein the number of outbound links included in the COLS is smaller than a number of outbound links available from the particular path selector;

transmitting the particular network packet on a selected outbound link of the COLS.

7. The method as recited in claim 6, wherein the particular path selector comprises a network switch device, wherein the number of outbound links available from the particular path selector is no greater than a number of output ports of the network switch device, and wherein the number of outbound links is based at least in part on a balance between the probability of a network failure between the particular source and the particular destination and a level of network workload distribution.

8. The method as recited in claim 6, wherein the network comprises a plurality of switch tiers including a first tier and a second tier, wherein the particular path selector comprises a first network switch device at the first tier, and wherein the first outbound link connects the first network switch device to a second network switch device of the second tier.

9. The method as recited in claim 6, wherein a virtualization management component of a particular instance host of a provider network comprises the particular path selector, wherein the number of outbound links available from the particular path selector corresponds to a number of virtual network interfaces associated with a network intermediary reachable from the particular instance host.

10. The method as recited in claim 6, wherein the number of outbound links included in the COLS is based at least in part on one or more of: (a) a fault isolation goal or (b) a load balancing goal.

11. The method as recited in claim 6, further comprising:
assigning, by the particular path selector to a different network packet received at the particular path selector, a label indicating a plurality of network links over which the different network packet is to be transmitted sequentially, wherein the plurality of network links includes the first outbound link, wherein the first outbound link connects the particular path selector to a different path selector; and
forwarding, by the different path selector, the different network packet along a particular outbound link indicated in the label.

12. The method as recited in claim 6, wherein said identifying the first PFC is based at least in part on examining one or more headers of the particular network packet.

13. The method as recited in claim 12, wherein the one or more headers include one or more of: (a) a source address header, (b) a destination address header, (c) a source port, (d) a destination port, (e) a source media access control (MAC) address, or (f) a destination MAC address.

14. The method as recited in claim 6, wherein said identifying the first PFC is based at least in part on a value of a link polarization prevention factor.

15. The method as recited in claim 6, further comprising:
identifying, by the particular path selector from among the outbound links of the COLS, a particular outbound link on which the particular network packet is to be transmitted, wherein said identifying is based at least in part on one of: (a) a random selection policy, (b) a round-robin selection policy, or (c) a hash value obtained from at least a portion of the particular network packet.

16. The method as recited in claim 6, wherein the first and second outbound links are selected for inclusion in the COLS using a combinatorial technique.

17. A path selector device of a network comprising a plurality of path selector devices, wherein the path selector device is configured to:
receive or determine a mapping between a plurality of packet flow categories and a plurality of candidate outbound link sets of the path selector device, wherein the mapping indicates respective numbers of outbound links corresponding to respective candidate outbound link sets (COLS), wherein the respective numbers of outbound links are determined based at least in part on characteristics of the network, and wherein the respective numbers of outbound links are smaller than a number of the plurality of outbound links available from the path selector device;
identify, in response to receiving a particular network packet from a particular traffic source and directed to a particular traffic destination, a first packet flow category (PFC) to which the particular network packet belongs;
determine, based at least in part on the mapping between the plurality of packet flow categories and the plurality of outbound link sets, a first COLS mapped to the first PFC, wherein the first COLS includes at least a first outbound link of the first path selector device and a second outbound link of the first path selector device;
select, based at least in part on the first outbound link being different than the second outbound link, the first outbound link from among the number of outbound links included in the first COLS; and
transmit the particular network packet on the first outbound link of the first COLS.

18. The path selector device as recited in claim 17, wherein the plurality of path selector devices is arranged in one of: a fat tree topology, a VL2 (Virtual Layer 2) topology, a BCube topology, or a different Clos topology.

19. The path selector device as recited in claim 17, wherein the path selector device is further configured to:
determine that another network packet received at the path selector device belongs to a second PFC;
identify a second COLS corresponding to the second PFC, wherein at least one outbound link of the second COLS is also included in the first COLS and at least one outbound link of the second COLS is not included in the first COLS; and
transmit the other network packet on an outbound link of the second COLS.

20. The path selector device as recited in claim 17, wherein the path selector device is further configured to:
determine that a different network packet received at the path selector device belongs to a second PFC;
determine that the first COLS is to be used for packets of the second PFC; and
transmit the different network packet on an outbound link of the first COLS.

21. A non-transitory computer-accessible storage medium storing program instructions that when executed on one or more processors implements a particular path selector of a network, wherein the particular path selector is configured to:
receive or determine a mapping between a plurality of packet flow categories and a plurality of candidate outbound link sets of the particular path selector, wherein the mapping indicates respective numbers of outbound links corresponding to respective candidate outbound link sets (COLS), wherein the respective numbers of outbound links are determined based at least in part on characteristics of the network, and wherein the respective numbers of outbound links are smaller than a number of the plurality of outbound links available from the particular path selector;

identify, in response to receiving a particular network packet from a particular traffic source and directed to a particular traffic destination, a first packet flow category (PFC) to which the particular network packet belongs;

determine, based at least in part on the mapping between the plurality of packet flow categories and the plurality of candidate outbound link sets, a first COLS mapped to the first PFC, wherein the first COLS includes at least a first outbound link of the particular path selector and a second outbound link of the particular path selector;

select, based at least in part on the first outbound link being different than the second outbound link, the first outbound link from among the number of outbound links included in the first COLS; and transmit the particular network packet on the first outbound link of the first COLS.

* * * * *